(12) United States Patent
Schleicher et al.

(10) Patent No.: US 9,138,670 B2
(45) Date of Patent: Sep. 22, 2015

(54) SYSTEM AND METHOD FOR SYNGAS TREATMENT

(71) Applicant: General Electric Company, Schenectady, NY (US)

(72) Inventors: Jay Christopher Schleicher, Houston, TX (US); Fredric Samuel Russ, Humble, TX (US)

(73) Assignee: General Electric Company, Schenectady, NY (US)

( * ) Notice: Subject to any disclaimer, the term of this patent is extended or adjusted under 35 U.S.C. 154(b) by 267 days.

(21) Appl. No.: 13/662,240

(22) Filed: Oct. 26, 2012

(65) Prior Publication Data

US 2014/0120004 A1 May 1, 2014

(51) Int. Cl.
*B01D 45/08* (2006.01)

(52) U.S. Cl.
CPC ..................... *B01D 45/08* (2013.01)

(58) Field of Classification Search
USPC .................... 96/286, 287, 288, 289
See application file for complete search history.

(56) References Cited

U.S. PATENT DOCUMENTS

| | | | | |
|---|---|---|---|---|
| 2,486,505 | A | | 11/1949 | Stratford |
| 2,522,905 | A | * | 9/1950 | Smith ............................. 159/10 |
| 3,585,237 | A | | 6/1971 | Terrana et al. |
| 4,135,894 | A | * | 1/1979 | Himes et al. .................... 95/215 |
| 4,159,306 | A | | 6/1979 | Borst |
| 4,214,881 | A | * | 7/1980 | Filss .............................. 96/282 |
| 4,326,856 | A | | 4/1982 | Muenger et al. |
| 4,392,986 | A | | 7/1983 | Yang et al. |
| 4,762,539 | A | * | 8/1988 | Muto ............................. 96/269 |
| 5,681,371 | A | * | 10/1997 | Carr ............................... 95/204 |
| 5,687,832 | A | * | 11/1997 | Thiessen ....................... 198/676 |
| 5,851,361 | A | | 12/1998 | Hogan |
| 2004/0079234 | A1 | * | 4/2004 | Gorbulsky ..................... 96/289 |
| 2005/0226790 | A1 | | 10/2005 | Park et al. |
| 2010/0068123 | A1 | | 3/2010 | Edwin et al. |
| 2011/0162278 | A1 | * | 7/2011 | DePuy et al. ................. 48/62 R |

* cited by examiner

*Primary Examiner* — Duane Smith
*Assistant Examiner* — Phillip Shao
(74) *Attorney, Agent, or Firm* — Fletcher Yoder, P.C.

(57) ABSTRACT

A system includes a particulate removal system configured to remove particulates from a syngas to generate a treated syngas and a particulate flow. The particulate removal system includes a shell. The shell includes a syngas inlet configured to receive the syngas, a syngas outlet configured to discharge the treated syngas, and a particulate outlet configured to discharge the particulate flow. The particulate removal system also includes a particulate collection surface disposed in the shell and configured to adhere the particulates from the syngas to the particulate collection surface as the particulate collection surface rotates toward the syngas and to separate the particulates from the particulate collection surface as the particulate collection surface rotates away from the syngas.

23 Claims, 3 Drawing Sheets

SYSTEM AND METHOD FOR SYNGAS TREATMENT

BACKGROUND OF THE INVENTION

The subject matter disclosed herein relates to syngas systems, and, more particularly, to syngas treatment systems.

Gasifiers convert carbonaceous materials into a mixture of carbon monoxide and hydrogen, referred to as synthesis gas or syngas, through the partial oxidation of a fuel, such as coal, natural gas, heavy fuels, and so forth, with oxygen or air. The syngas may be used for power generation (e.g., using integrated gasification combined cycle (IGCC) technology), chemical production, or any other suitable application. Unfortunately, the produced syngas may include ash, solids, and other particulate matter that may interfere with the operation of downstream equipment.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a particulate removal system configured to remove particulates from a syngas to generate a treated syngas and a particulate flow. The particulate removal system includes a shell. The shell includes a syngas inlet configured to receive the syngas, a syngas outlet configured to discharge the treated syngas, and a particulate outlet configured to discharge the particulate flow. The particulate removal system also includes a particulate collection surface disposed in the shell and configured to adhere the particulates from the syngas to the particulate collection surface as the particulate collection surface rotates toward the syngas and to separate the particulates from the particulate collection surface as the particulate collection surface rotates away from the syngas.

In a second embodiment, a method includes receiving a syngas in a particulate removal system, rotating a particulate collection surface disposed in a shell of the particulate removal system toward the syngas, adhering particulates from the syngas on the particulate collection surface to generate a treated syngas, rotating the particulate collection surface away from the syngas and separating the particulates from the particulate collection surface to generate a particulate flow, discharging the treated syngas from the particulate removal system, and discharging the particulate flow from the particulate removal system.

In a third embodiment, a system includes a syngas generator configured to generate a syngas, and a particulate removal system configured to remove particulates from the syngas to generate a treated syngas and a particulate flow. The particulate removal system includes a shell. The shell includes a syngas inlet configured to receive the syngas, a syngas outlet configured to discharge the treated syngas, a fluid inlet configured to receive a fluid, a fluid sump configured to contain the fluid, and a particulate outlet configured to discharge the particulate flow and a portion of the fluid. The particulate system also includes a particulate collection surface disposed in the shell and configured to adhere the particulates from the syngas to the particulate collection surface as the particulate collection surface rotates toward the syngas and to separate the particulates from the particulate collection surface as the particulate collection surface rotates toward the fluid sump. The system also includes a syngas receiver configured to receive the treated syngas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
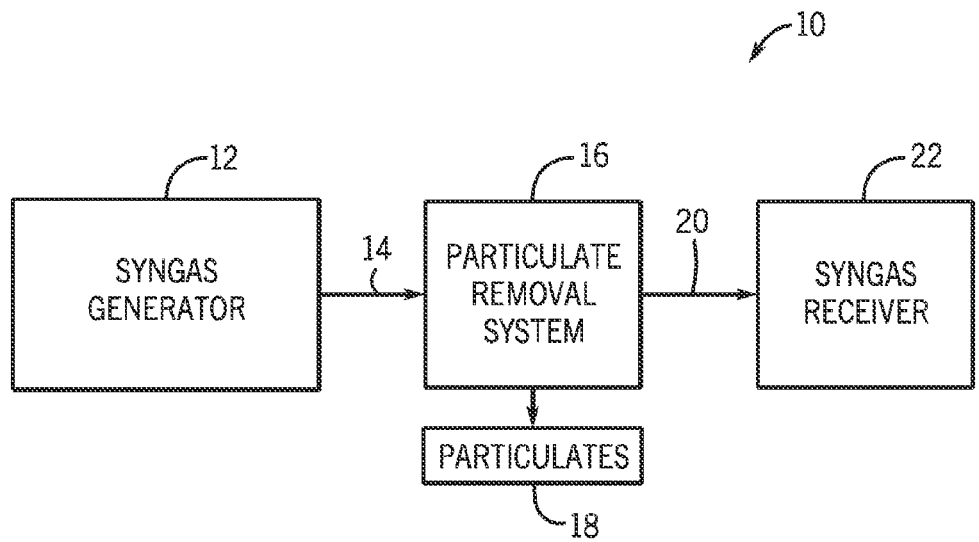
FIG. 1 is a schematic diagram of an embodiment of a syngas system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a particulate removal system that removes particulates from a syngas to generate a treated syngas and a particulate flow. In other words, the treated syngas may include fewer particulates than the syngas received by the particulate removal system. For example, the syngas may be generated by a syngas generator, such as a gasifier. In certain embodiments, the gasifier may be part of an integrated gasification combined cycle (IGCC) power plant or a coal-to-chemical plant. The treated syngas from the particulate removal system may be received by a syngas receiver, such as a convective syngas cooler, radiant syngas cooler, or quench gasifier in an IGCC power plant or coal-to-chemical plant. The convective syngas cooler includes a heat exchanger configured to cool the treated syngas by transferring heat from the treated syngas to water, thereby generating steam. The particulate removal system may include several components for removing the particulates from the syngas. For example, the particulate removal system may include a shell and a particulate collection surface disposed in the shell. The shell may include a syngas inlet that receives the syngas, a syngas outlet that discharges the treated syngas, and a particulate outlet that discharges the particulate flow. The particulate collection surface may adhere the particulates from the syngas to the particulate collection surface as the particulate collection surface rotates toward (e.g., against the flow of) the syngas. In addition, the particulate collection surface may separate the particulates from the particulate collection surface as the particulate collection surface rotates away from (e.g., with the flow of) the syngas. Thus, the particulate removal system removes the particulates from the syngas to generate the treated syngas and the particulate flow.

By removing the particulates from the syngas, the particulate removal system may offer several advantages in the operation of IGCC power plant or coal-to-chemicals plant. For example, the particulates in the syngas may tend to accumulate in the syngas receiver, such as the convective syngas cooler. Specifically, the particulates may cover the heat transfer surfaces of the convective syngas cooler, thereby decreasing the heat transfer efficiency of the convective syngas cooler. The convective syngas cooler may be taken out of service and washed to remove the accumulated particulates. This maintenance may decrease the operating efficiency of the IGCC power plant or coal-to-chemicals plant and/or increase the operating and capital costs associated with the IGCC power plant or coal-to-chemicals plant. By removing the particulates from the syngas using the particulate removal system, fewer particulates may accumulate in the convective syngas cooler, thereby increasing the operating efficiency of the IGCC power plant or coal-to-chemicals plant. In addition, maintenance associated with operating the IGCC power plant or coal-to-chemicals plant may be reduced by using the particulate removal system.

With the forgoing in mind, FIG. 1 is a block diagram of an embodiment of a syngas system 10. In certain embodiments, the syngas system 10 may be part of the IGCC power plant or coal-to-chemicals plant. As shown in FIG. 1, the syngas system 10 may include a syngas source or generator 12, such as, but not limited to, a gasifier, radiant syngas cooler, quench system, and so forth. The syngas generator 12 generates a syngas 14 that is received by a particulate removal system 16. The syngas 14 may include various particulates, such as, but not limited to, ash, fines, solids, powders, and so forth. As described in detail below, the particulate removal system 16 generates a particulate flow 18 and a treated syngas 20. Specifically, the particulate flow 18 includes particulates removed from the syngas 14. A syngas receiver 22, such as, but limited to, a convective syngas cooler, a scrubber, a syngas treatment system (e.g., an acid gas removal unit, sulfur processor, carbon capture system, etc.), gas turbine engine, furnace, boiler, and so forth, may receive the treated syngas 20 from the particulate removal system 16. The operation and/or efficiency of the syngas receiver 22 may be negatively affected by the accumulation of particulates in the syngas receiver 22. Thus, by removing the particulates from the syngas 14 to produce the treated syngas 20, the particulate removal system 16 may increase the availability and/or efficiency of the syngas receiver 22.

Figure 2:
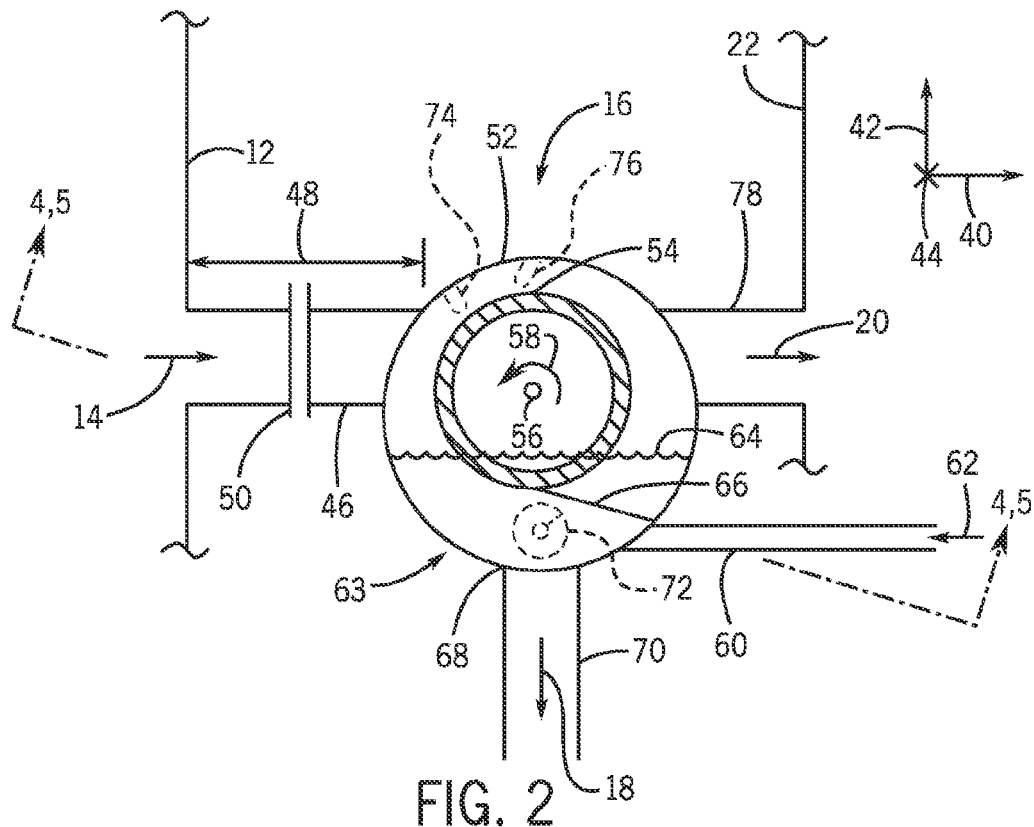
FIG. 2 is a side cross-sectional view of an embodiment of a particulate removal system.

FIG. 2 illustrates a side cross-section of the particulate removal system 16. In the following discussion, reference may be made to an x-axis 40, a y-axis 42, and a z-axis 44. As shown in FIG. 2, a syngas inlet 46 is coupled to the syngas generator 12 and the particulate removal system 16. The syngas inlet 46 receives the syngas 14 from the syngas generator 12. A length 48 of the syngas inlet 46 may be reduced to help prevent accumulation of the particulates in the syngas inlet 46. In certain embodiments, a flange 50 or other coupling may be included in the syngas inlet 46 to facilitate installation and removal of the particulate removal system 16.

In the illustrated embodiment, the particulate removal system 16 includes a shell 52, which may be a cylindrical pressure vessel or other enclosure for the components of the particulate removal system 16. In other embodiments, the shell 52 may have other cross-sectional shapes. For example, the cross-sectional shape of the shell 52 may be an oval, square, rectangle, polygon, and so forth. A pressure rating of the shell 52 may be greater than or equal to a pressure rating of the syngas generator 12 to help prevent overpressure damage to the shell 52 during operation of the syngas generator 12. The shell 52 may be made from materials similar to those used in the fabrication of the syngas generator 12. For example, the shell 52 may be made from materials suited for use at the high temperatures and/or acidic conditions associated with the syngas 14. In certain embodiments, nickel-chromium alloys, such as Incoloy 600, Incoloy 625, or Incoloy 800 may be used for the shell 52.

A particulate collection surface 54 may be disposed in the shell 52. For example, the particulate collection surface 54 may be a portion of a pipe, as shown in FIG. 2. In other words, the particulate collection surface 54 may be hollow and have a cylindrical shape. In other embodiments, the particulate collection surface 54 may not be hollow (e.g., solid or partially solid). As with the shell 52, the particulate collection surface 54 may be made from materials suited for use at the high temperatures and/or acidic conditions associated with the syngas 14. In certain embodiments, the shell 52 may be cladded (e.g., covered) with a different material suited for the high temperatures, which may be less expensive than making the entire shell 52 from a more expensive high-temperature alloy or material. For example, the shell 52 may include a chemical resistant coating, a thermal barrier coating, a wear resistant coating, or any combination thereof, along the particulate collection surface 54. A shaft 56 may be coupled to the particulate collection surface 54 and used to rotate the particulate collection surface about an axis. For example, the shaft 56 may be used to rotate the particulate collection surface 54 about an axis generally parallel with the z-axis 44. As shown in FIG. 2 the particulate collection surface 54 may rotate in a counterclockwise direction, as indicated by arrow 58. Thus, the particulate collection surface 54 rotates toward (e.g., against the flow of) the syngas 14 entering through the syngas inlet 46. In other words, as the particulate collection surface 54 rotates in the counterclockwise direction 58, the syngas 14 flows through the shell 52 toward the rotating particulate collection surface 54 and particulates in the syngas 14 may adhere to the particulate collection surface 54. Thus, the amount of particulates in the treated syngas 20 leaving the particulate removal system 16 may be less than the amount of particulates in the syngas 14 entering the particulate removal system 16.

In certain embodiments, a fluid inlet 60 may be coupled to the shell 52 to enable a fluid 62 to flow into the particulate removal system 16. Specifically, the fluid inlet 60 may convey the fluid 62 into a fluid sump 63 of the shell 52. The fluid sump 63 may be located toward a bottom of the shell 52 and accumulate the fluid 62, as indicated by a fluid level 64. In certain embodiments, the fluid 62 may be a liquid, such as, but not limited to, water or other solvent. In further embodiments, the particulate collection surface 54 may be at least partially submerged in the fluid 62 of the fluid sump 63. In other words, a portion of the external surface of the particulate collection surface 54 may be covered by the fluid 62. The fluid 62 may serve several purposes, such as, but not limited to, assisting in moving the particulates out of the particulate removal system 16, cooling the internal components of the particulate removal system 16 from the hot syngas 14 passing through the particulate removal system 16, and so forth. In addition, as the particulate collection surface 54 rotates, a portion or layer of the fluid 62 clinging to the particulate collection surface 54 may be carried along with the external surface of the particulate collection surface 54. Thus, the particulate collection surface 54 impacted by the syngas 14 may be at least partially covered by the fluid 62, thereby increasing the adhesive properties of the particulate collection surface 54. In other words, more of the particulates in the syngas 14 may adhere to the particulate collection surface 54 when the surface 54 is at least partially covered by the fluid 62 than when the surface 54 is not covered by the fluid 62.

In further embodiments, the particulate removal system 16 may include a scraper 66. For example, the scraper 66 may be coupled to an interior surface of the shell 52, disposed in the fluid sump 63, and may be at least partially covered by the fluid 62. The scraper 66 may be configured as a rectangular sheet of metal that is approximately the same width as the particulate collection surface 54. The scraper 66 may be positioned within the particulate removal system 16, such that the scraper 66 at least partially removes particulates adhered to the particulate collection surface 54. In other words, the scraper 66 may directly contact the particulate collection surface 54 or be in close proximity to the particulate collection surface such that the scraper physically dislodges particulates adhered to the particulate collection surface 54. Thus, the scraper 66 may help prevent a build-up of particulates on the particulate collection surface 54, thereby maintaining the efficiency of the particulate removal system 16. In further embodiments, as the particulate collection surface 54 enters the fluid sump 63 and comes in contact with the fluid 62, the particulates may be discharged or removed from the particulate collection surface 54 with the aid of the fluid 62. In certain embodiments, the particulate removal system 16 may include additional devices (e.g., mechanical stirrers, fluid jets, etc.) to add turbulence or mixing of the fluid 62 to help remove the particulates from the particulate collection surface 54. In some embodiments, the scraper 66 may supplement the fluid 62 in the fluid sump 63, the scraper 66 may be used without the fluid 62 in the sump 63, or the fluid 62 may be used without the scraper 66. In addition, the particulates adhered to the particulate collection surface 54 may be discharged or fall from the particulate collection surface 54 at least in part due to gravity with or without use of the scraper 66 and/or the fluid 62 in the sump 63.

A particulate outlet 68 may be coupled to the shell 52 to discharge the particulate flow 18 from the particulate removal system 16. In embodiments that include the fluid 62, the particulate outlet 68 may also discharge a portion of the fluid 62 in particulate flow 18. A particulate outlet conduit 70 may be used to convey the particulate flow 18 and/or fluid 62 to other equipment for further processing.

Other embodiments of the particulate removal system 16 may include additional features to improve the particulate removal efficiency. For example, the particulate removal system 16 may include an auger 72 disposed in the fluid sump 63. The auger 72 may include a helical screw to help move the separated particulates toward the particulate outlet 70. In other embodiments, the particulate removal system may include one or more fluid injectors, such as a liquid injector 74 and/or a gas injector 76. For example, the liquid injector 74 may direct a liquid, such as the fluid 62 (e.g., water), toward the particulate collection surface 54 to help maintain a fluid layer (e.g., wetness) along the particulate collection surface 54, thereby improving the collection of particulates. The liquid injector 74 also may provide the liquid (e.g., liquid jet) to help discharge or knock off adhered particulates from the particulate collection surface 54. In addition, the liquid injector 74 may create or provide a liquid wall for the syngas 14 to pass through, thereby increasing the particulate removal efficiency of the particulate removal system 16. In other embodiments, the gas injector 76 may be used to direct a vapor or gas, such as steam, air, carbon dioxide, nitrogen, or other inert gases, to help discharge or knock off the adhered particulates from the particulate collection surface 54 into the sump 63. As shown in FIG. 2, the gas injector 76 may be directed toward the incoming syngas 14 to help prevent the particulates from being blown into the treated syngas 20. In the illustrated embodiment, a syngas outlet 78 may be coupled to the shell 52 to convey the treated syngas 20 to the syngas receiver 22. As with the syngas inlet 46, the syngas outlet 78 may include a flange or other coupling to facilitate installation and removal of the particulate removal system 16.

Figure 3:
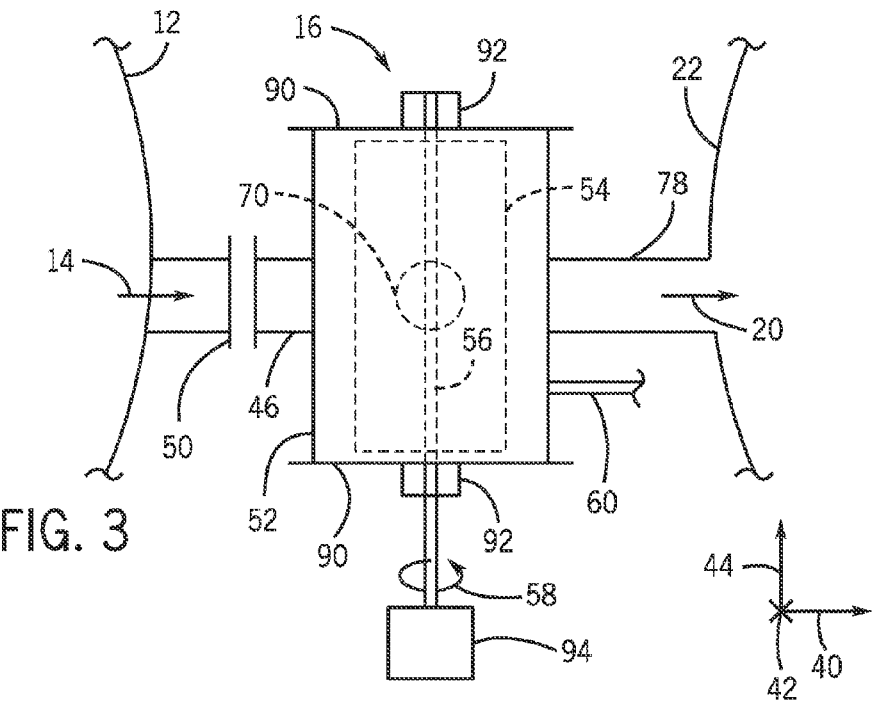
FIG. 3 is a top cross-sectional view of an embodiment of a particulate removal system.

FIG. 3 is a top cross-section of the particulate removal system 16. Elements in FIG. 3 in common with those shown in FIG. 2 are labeled with the same reference numerals. As shown in FIG. 3, the particulate collection surface 54 may extend along substantially the entire width of the shell 52. Thus, a substantial portion of the syngas 14 comes in contact with the particulate collection surface 54 as the syngas 14 moves through the particulate removal system 16. In addition, both the syngas inlet 46 and the syngas outlet 78 may be coupled toward a middle of the shell 52. Similarly, the particulate outlet 70 may be coupled toward the middle of the shell 52. In other embodiments, the syngas inlet 46, syngas outlet 78, and particulate outlet 70 may be located a different locations than those shown in FIG. 3. As shown in FIG. 3, ends of the shell 52 may be covered by two flanges 90 (or end covers) to completely enclose the particulate removal system 16. Further, stuffing boxes 92 may be coupled to one or both of the flanges 90. The stuffing boxes 92 may help prevent the discharge of syngas 14 and/or treated syngas 20 from the particulate removal system 16 from around the shaft 56. In addition, a driver 94 may be used to rotate the particulate collection surface 54 in the counterclockwise direction 58 via the shaft 56. The driver 94 may be powered using steam, hydraulics, electricity, and so forth. For example, the driver 94 may be an electrical motor. In certain embodiments, the driver 94 may also rotate the auger 72.

Figure 4:
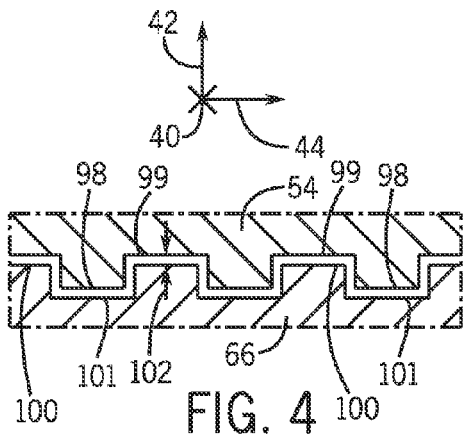
FIG. 4 is a cross-sectional view of an embodiment of a particulate collection surface and a scraper of a particulate removal system.

FIG. 4 is a cross-section of the particulate collection surface 54 and the scraper 66 along the line labeled 4-4 in FIG. 2. As shown in FIG. 4, the particulate collection surface 54 may include a plurality of first external teeth 98 and intermediate grooves 99, and the scraper 66 may include a plurality of second external teeth 100 and intermediate grooves 101. In other words, the surface of the particulate collection surface 54 may be ridged or toothed instead of flat, and the edge of the scraper 66 against the particulate collection surface 54 may be shaped to generally interface with the ridges or teeth of the particulate collection surface 54. The first and second teeth 98 and 100 (and intermediate grooves 99 and 101) may increase the surface areas of the particulate collection surface 54 and the scraper 66, respectively, thereby increasing the particulate removal efficiency of the particulate removal system 16. By increasing the surface areas of particulate collection surface 54 using the first teeth 98 and grooves 99, additional particulates may adhere to the surface 54 than if the surface 54 was flat. The first and second external teeth 98 and 100 (and intermediate grooves 99 and 101) may be separated from one another by a clearance gap or separation distance 102, which may be selected to be small enough to remove the particulates from the particulate collection surface 54 and yet large enough to help reduce the possibility of rubbing of the particulate collection surface 54 against the scraper 66. In other embodiments, the separation distance 102 may be essentially zero and the scraper 66 may contact the particulate collection surface 54. As shown in FIG. 4, the first and second external teeth 98 and 100 (and intermediate grooves 99 and 101) may have a rectangular-shaped pattern.

Figure 5:
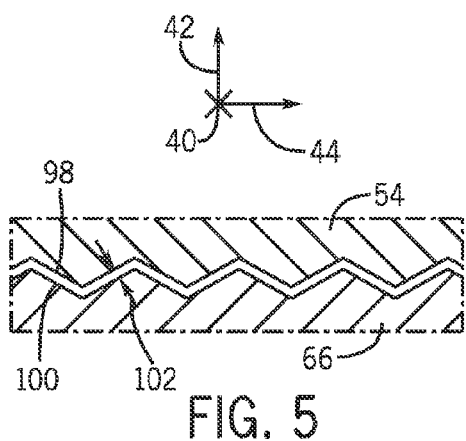
FIG. 5 is a cross-sectional view of an embodiment of a particulate collection surface and a scraper of a particulate removal system with saw-tooth patterns.

FIG. 5 is a cross-section of the particulate collection surface 54 and the scraper 66 along the line labeled 5-5 in FIG. 2. Elements in FIG. 5 in common with those shown in FIG. 4 are labeled with the same reference numerals. As shown in FIG. 5, the first and second external teeth 98 and 100 may have a saw tooth pattern. For example, each of the teeth 98 and 100 is generally triangular or V-shaped. In other embodiments, the first and second internal teeth 98 and 100 may have other shapes or patterns to help increase the surface areas of the particulate collection surface 54 and/or the scraper 66.

Figure 6:
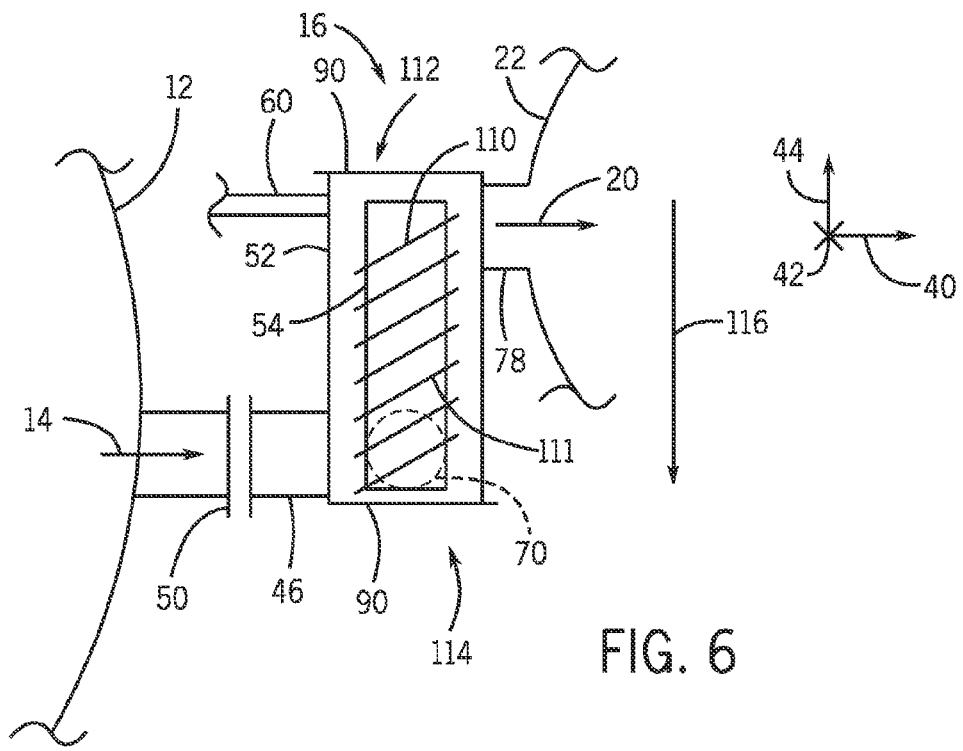
FIG. 6 is a top cross-sectional view of an embodiment of a sloped particulate removal system.

FIG. 6 is a top cross-section of an embodiment of the particulate removal system 16. In the illustrated embodiment, the particulate collection surface 54 may include an externally threaded flange 110 (e.g., an external helical flange 110 with a spiral thread 111), which may help convey the particulates toward the particulate outlet 70. In other words, the external helical flange 110 of the particulate collection surface 54 may function in a similar manner to the auger 72 shown in FIG. 2. In certain embodiments, the shell 52 may include a high end 112 and a low end 114. In other words, the high end 112 may be disposed vertically above the low end 114. For example, the shell 52 may be sloped downward in the direction indicated by arrow 116. The syngas inlet 46 may be disposed at the low end 114 and the syngas outlet 78 may be disposed at the high end 112. This arrangement of the syngas inlet 46 and the syngas outlet 78 may encourage more of the particulates to be separated from the syngas 14. In other words, the syngas 14 travels along the length of the particulate collection surface 54 before reaching the syngas outlet 78. In certain embodiments, the fluid inlet 60 may be disposed at the high end 112 and the particulate outlet 70 may be disposed at the low end 114. This arrangement of the fluid inlet 60 and the particulate outlet 70 may help encourage the particulates to move toward the particulate outlet 70. In other words, the fluid 62 moving in the direction 116 may help to wash or move particulates toward the particulate outlet 70. In addition, this arrangement may help maintain the wetness of the particulate collection surface 54 of the flange 110.

Figure 7:
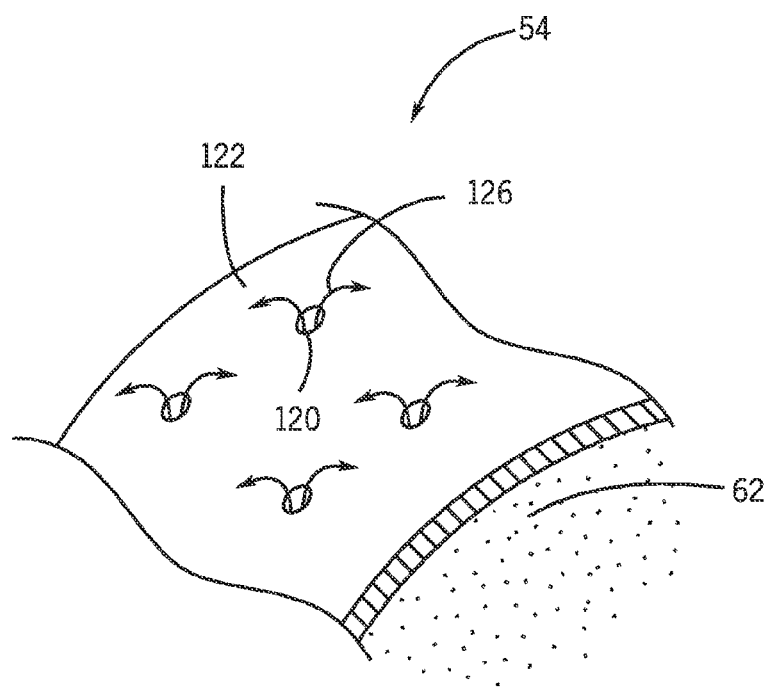
FIG. 7 is a perspective view of an embodiment of a particulate collection surface of a particulate removal system.

FIG. 7 is a perspective view of an embodiment of the particulate collection surface 54. Specifically, the particulate collection surface 54 may have a hollow cylindrical shape. The fluid 62 may be supplied to an interior of the particulate collection surface 54. A plurality of holes 120 may be formed in an external surface 122 of the particulate collection surface 54, thereby enabling the fluid 62 to flow out from the plurality of holes 120 as indicated by arrows 126. The plurality of holes 120 may help provide a coating or layer of the fluid 52 on the external surface 122 of the particulate collection surface 54, thereby increasing the particulate removal efficiency of the particulate removal system 16.

As described above, certain embodiments of the syngas system 10 may include the particulate removal system 16 to remove particulates from the syngas 14 to generate the treated syngas 20 and the particulate flow 18. The particulate removal system 16 may include the particulate collection surface 54 disposed in the shell 52. Specifically, the particulate collection surface 54 may adhere the particulate from the syngas 14 to the particulate collection surface 54 as the particulate collection surface 54 rotates towards the syngas 14, and separate the particulates from the particulate collection surface 54 as the particulate collection surface 54 rotates away from the syngas 14. The shell 52 may include the syngas inlet 46, the syngas outlet 78, and the particulate outlet 70. By removing the particulates from the syngas 14, the particulate removal system 16 may reduce the amount of particulates that enter the syngas receiver 22. Thus, problems associated the accumulation of particulates in the syngas receiver 22 may be reduced. For example, cleaning of the convective syngas cooler, an example of the syngas receiver 22, may be conducted at less frequent intervals when the particulate removal system 16 is used to remove particulates from the syngas 14. Thus, the availability of the convective syngas cooler may be increased and maintenance costs associated with the convective syngas cooler may be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a particulate removal system configured to remove particulates from a syngas to generate a treated syngas and a particulate flow, wherein the particulate removal system comprises:
a shell comprising:
a syngas inlet configured to receive the syngas;
a syngas outlet configured to discharge the treated syngas; and
a particulate outlet configured to discharge the particulate flow; and
a rotary structure having a particulate collection surface disposed about a rotational axis in the shell, wherein the system comprises at least one of:
the particulate removal system is configured to block flow of the syngas through the particulate collection surface in a radial direction relative to the rotational axis; or
a syngas flow path through the shell from the syngas inlet to the syngas outlet, wherein the syngas flow path is crosswise to the rotational axis upstream and downstream of the rotary structure; or
a plurality of surface features spaced apart from one another on the particulate collection surface, wherein the plurality of surface features comprises a plurality of protrusions, a plurality of recesses, or a combination thereof.

2. The system of claim 1, wherein the particulate removal system is configured to block flow of the syngas through the particulate collection surface in the radial direction relative to the rotational axis.

3. The system of claim 2, wherein the particulate collection surface is closed circumferentially about the rotational axis.

4. The system of claim 2, wherein a supply of the fluid is configured to flow the fluid into an interior of the rotary structure and outwardly through one or more openings to wet the particulate collection surface along a syngas flow path between the syngas inlet and the syngas outlet.

5. The system of claim 1, comprising a scraper configured to scrape the particulate collection surface to remove the particulates from the particulate collection surface.

6. The system of claim 5, wherein the particulate collection surface comprises a plurality of first teeth configured to interface with a plurality of second teeth of the scraper, wherein the plurality of first teeth and the plurality of second teeth extend circumferentially about the rotational axis of the rotary structure.

7. The system of claim 1, wherein the shell comprises the fluid sump configured to contain the fluid, and the particulate collection surface is configured to move at least partially through the fluid of the fluid sump.

8. The system of claim 1, comprising a fluid injector configured to direct the fluid against the particulate collection surface.

9. The system of claim 1, comprising a syngas flow path through the shell from the syngas inlet to the syngas outlet, wherein the syngas flow path is crosswise to the rotational axis upstream and downstream of the rotary structure.

10. The system of claim 1, comprising the plurality of surface features spaced apart from one another on the particulate collection surface, wherein the plurality of surface features comprises the plurality of protrusions, the plurality of recesses, or the combination thereof.

11. The system of claim 10, wherein the plurality of surface features comprises a spiraling protrusion extending about the rotational axis.

12. A method, comprising:
receiving a syngas in a particulate removal system;
flowing the syngas directly against a particulate collection surface along a sidewall of a rotary structure rotating about a rotational axis in a shell of the particulate removal system, wherein the sidewall is disposed about the rotational axis;
adhering particulates from the syngas on the particulate collection surface, while rotating the rotary structure, to generate a treated syngas;
flowing the treated syngas directly away from the particulate collection surface of the rotary structure;
separating the particulates from the particulate collection surface to generate a particulate flow;
discharging the treated syngas from the particulate removal system; and
discharging the particulate flow from the particulate removal system.

13. The method of claim 12, comprising providing the fluid on the particulate collection surface to increase the adhesion of the particulates to the particulate collection surface.

14. The method of claim 12, comprising physically separating the particulates from the particulate collection surface using a scraper.

15. The method of claim 12, comprising blocking flow of the syngas through the particulate collection surface in a radial direction relative to the rotational axis.

16. A system, comprising:
a particulate removal system configured to remove particulates from a syngas to generate a treated syngas and a particulate flow, wherein the particulate removal system comprises:
a shell comprising:
a syngas inlet configured to receive the syngas;
a syngas outlet configured to discharge the treated syngas;
a fluid inlet configured to receive a fluid;
a fluid sump configured to contain the fluid; and
a particulate outlet configured to discharge the particulate flow and a portion of the fluid; and
a rotary structure having a particulate collection surface disposed about a rotational axis in the shell, wherein the particulate removal system is configured to block flow of the syngas through the particulate collection surface in a radial direction relative to the rotational axis.

17. The system of claim 16, comprising a syngas generator coupled to the syngas inlet, wherein the syngas generator comprises at least one of a gasifier, a radiant syngas cooler, or a quench system, or a combination thereof.

18. The system of claim 16, comprising a syngas receiver coupled to the syngas outlet, wherein the syngas receiver comprises at least one of a convective syngas cooler, a scrubber, a syngas treatment system, a gas turbine engine, a furnace, or a boiler, or a combination thereof.

19. The system of claim 16, wherein the particulate collection surface comprises at least one of a chemical resistant coating, a thermal barrier coating, or a wear resistant coating.

20. The system of claim 16, wherein the shell comprises a high end and a low end, the high end is disposed above the low end, the fluid inlet is disposed at the high end, the particulate outlet is disposed at the low end, the syngas inlet is disposed at the low end, and the syngas outlet is disposed at the high end.

21. The system of claim 1, wherein the particulate removal system is configured to flow the syngas externally directly toward the particulate collection surface and flow the treated syngas externally directly away from the particulate collection surface.

22. The system of claim 16, wherein the particulate collection surface is closed circumferentially about the rotational axis.

23. The system of claim 16, wherein a supply of the fluid is configured to flow the fluid into an interior of the rotary structure and outwardly through one or more openings to wet the particulate collection surface along a syngas flow path between the syngas inlet and the syngas outlet.

* * * * *